US011241921B2

(12) United States Patent
Tauchi

(10) Patent No.: US 11,241,921 B2
(45) Date of Patent: Feb. 8, 2022

(54) PNEUMATIC TIRE

(71) Applicant: The Yokohama Rubber Co., LTD., Tokyo (JP)

(72) Inventor: Risa Tauchi, Hiratsuka (JP)

(73) Assignee: The Yokohama Rubber Co., LTD.

(*) Notice: Subject to any disclaimer, the term of this patent is extended or adjusted under 35 U.S.C. 154(b) by 0 days.

(21) Appl. No.: 16/968,556

(22) PCT Filed: Dec. 27, 2018

(86) PCT No.: PCT/JP2018/048319
§ 371 (c)(1),
(2) Date: Aug. 7, 2020

(87) PCT Pub. No.: WO2019/155787
PCT Pub. Date: Aug. 15, 2019

(65) Prior Publication Data
US 2020/0369097 A1 Nov. 26, 2020

(30) Foreign Application Priority Data
Feb. 8, 2018 (JP) .............................. JP2018-021096

(51) Int. Cl.
*B60C 15/04* (2006.01)
*B60C 15/06* (2006.01)
(Continued)

(52) U.S. Cl.
CPC .......... *B60C 15/04* (2013.01); *B60C 15/0607* (2013.01); *B60C 15/024* (2013.01);
(Continued)

(58) Field of Classification Search
CPC ... B60C 15/04; B60C 15/0607; B60C 15/024; B60C 15/02; B60C 15/00;
(Continued)

(56) References Cited

U.S. PATENT DOCUMENTS 6,276,417 B1 * 8/2001 Honbo ................. B60C 15/024
152/540
2012/0097310 A1 4/2012 Potier
(Continued)

FOREIGN PATENT DOCUMENTS

CN 103863015 A * 6/2014 ............... B60C 9/02
JP H11-192820 7/1999
(Continued)

OTHER PUBLICATIONS

Machine translation of JP2015-071355 (no date).*
International Search Report for International Application No. PCT/JP2018/048319 dated Apr. 9, 2019, 4 pages, Japan.

*Primary Examiner* — Justin R Fischer
*Assistant Examiner* — Philip N Schwartz
(74) *Attorney, Agent, or Firm* — Thorpe North & Western

(57) ABSTRACT

In a pneumatic tire on a rim with 5° taper, a bead core includes a bead core bottom inclined 0° to 5° with respect to a rotation axis in a direction in which the bead core bottom extends outward in a radial direction from an inner side toward an outer side in the lateral direction, a bead portion includes a bead base portion inclined 8° to 12° with respect to the rotation axis in a direction in which the bead base portion extends outward in the radial direction from the inner side toward the outer side in the lateral direction. A bead width BW is a distance between tire inner and outer surfaces on a straight line through a bead core center in the meridian cross-section and parallel to the bead base portion. The bead core has a maximum width CW within a range of $(BW \times 0.54) \leq CW \leq (BW \times 0.58)$.

10 Claims, 6 Drawing Sheets

(51) Int. Cl.
*B60C 15/024* (2006.01)
*B60C 15/00* (2006.01)

(52) U.S. Cl.
CPC ................. *B60C 2015/009* (2013.01); *B60C 2015/0614* (2013.01); *B60C 2200/06* (2013.01)

(58) Field of Classification Search
CPC ...... B60C 2015/0614; B60C 2015/009; B60C 2200/06
See application file for complete search history.

(56) References Cited

U.S. PATENT DOCUMENTS

| | | |
|---|---|---|
| 2018/0056719 A1 | 3/2018 | Bishop |
| 2018/0134097 A1 | 5/2018 | Isaka |

FOREIGN PATENT DOCUMENTS

| | | | | |
|---|---|---|---|---|
| JP | 2000-062418 | | 2/2000 | |
| JP | 2000-118210 | | 4/2000 | |
| JP | 2001206027 A | * | 7/2001 | ............ B60C 15/06 |
| JP | 2005-178668 | | 7/2005 | |
| JP | 2010-188818 | | 9/2010 | |
| JP | 5629275 | | 11/2014 | |
| JP | 2015071355 A | * | 4/2015 | ............ B60C 15/04 |
| JP | 2018-030529 | | 3/2018 | |
| JP | 2018-079802 | | 5/2018 | |
| WO | WO 2010/100102 | | 9/2010 | |

\* cited by examiner

| | CONVENTIONAL EXAMPLE | COMPARATIVE EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|---|
| MAXIMUM WIDTH CW OF BEAD CORE/BEAD WIDTH BW | 53% | 59% | 55% | 57% | 55% | 55% | 55% | 55% |
| BEAD WIDTH BW | 65 mm | 70 mm | 65 mm | 75 mm | 69 mm | 69 mm | 69 mm | 69 mm |
| MAXIMUM WIDTH CW OF BEAD CORE/HEIGHT CH OF BEAD CORE | 1.4 | 1.9 | 1.4 | 1.9 | 0.9 | 1.5 | 1.4 | 1.4 |
| DISTANCE BD1 FROM BEAD CORE BOTTOM CENTER TO SURFACE OF CARCASS CORD | 4 mm | 4 mm | 4 mm | 4 mm | 4 mm | 4 mm | 4 mm | 1.9 mm |
| COMPRESSION RATIO Z OF RUBBER LOCATED INWARD OF BEAD CORE IN TIRE RADIAL DIRECTION | 30% | 30% | 30% | 30% | 30% | 30% | 30% | 30% |
| WIDTH CBW OF BEAD CORE BOTTOM/WIDTH BBW OF BEAD BASE PORTION | 32% | 41% | 32% | 43% | 32% | 32% | 32% | 32% |
| DISTANCE DS BETWEEN BEAD CORE AND TIRE OUTER SURFACE | 10 mm | 12 mm | 10 mm | 12 mm | 12 mm | 12 mm | 12 mm | 12 mm |
| RIM SLIPPAGE RESISTANCE | 100 | 105 | 102 | 110 | 103 | 109 | 108 | 108 |
| BEAD DURABILITY | 100 | 90 | 104 | 101 | 104 | 103 | 104 | 105 |

FIG. 5A

| | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|
| MAXIMUM WIDTH CW OF BEAD CORE/BEAD WIDTH BW | 55% | 55% | 55% | 55% | 55% | 55% | 55% |
| BEAD WIDTH BW | 69 mm | 69 mm | 69 mm | 69 mm | 69 mm | 69 mm | 69 mm |
| MAXIMUM WIDTH CW OF BEAD CORE/HEIGHT CH OF BEAD CORE | 1.4 | 1.4 | 1.4 | 1.4 | 1.4 | 1.4 | 1.4 |
| DISTANCE BD1 FROM BEAD CORE BOTTOM CENTER TO SURFACE OF CARCASS CORD | 2.5 mm | 2.5 mm | 2.5 mm | 2.5 mm | 2.5 mm | 2.5 mm | 2.5 mm |
| COMPRESSION RATIO Z OF RUBBER LOCATED INWARD OF BEAD CORE IN TIRE RADIAL DIRECTION | 30% | 50% | 60% | 50% | 50% | 50% | 50% |
| WIDTH CBW OF BEAD CORE BOTTOM/WIDTH BBW OF BEAD BASE PORTION | 32% | 32% | 32% | 41% | 35% | 35% | 35% |
| DISTANCE DS BETWEEN BEAD CORE AND TIRE OUTER SURFACE | 12 mm | 12 mm | 12 mm | 12 mm | 12 mm | 17 mm | 15 mm |
| RIM SLIPPAGE RESISTANCE | 108 | 110 | 120 | 118 | 115 | 114 | 120 |
| BEAD DURABILITY | 106 | 106 | 106 | 103 | 105 | 107 | 110 |

FIG. 5B

PNEUMATIC TIRE

FIELD OF THE TECHNOLOGY

The present technology relates to a pneumatic tire.

BACKGROUND OF THE TECHNOLOGY

A pneumatic tire is mounted on a rim wheel by fitting, to a rim of the rim wheel, a bead portion including a bead core corresponding to an annular member formed by bundling a plurality of bead wires. The bead portion is actually mounted on the rim wheel in a case where the pneumatic tire is mounted on the rim wheel, and thus some known pneumatic tires deliver desired performance achieved by making various improvements to the bead portion.

For example, in a pneumatic tire described in Japan Patent No. 5629275, the bead core has an increased width in the tire lateral direction to reduce local pressure to suppress damage to the rim. Additionally, in the tire described in Japan Patent No. 5629275, a bead heel portion of a bead base portion in a meridian cross-section has a round contour with a large radius of curvature, thus allowing the tire to be easily mounted on the rim. Additionally, a heavy duty radial tire described in Japan Unexamined Patent Publication No. 2010-188818 includes a pneumatic tire offering rim slippage resistance improved without an increase in weight by setting, within respective predetermined ranges, a compression factor defined by dividing, by the total thickness, before rim mounting, of only a rubber portion radially inward from the bead core, a compression margin corresponding to a difference between the total thickness before rim mounting and the total thickness after rim mounting, and the ratio of a bead core effective width to a bead core maximum width.

Pneumatic tires are mounted on various types of vehicles and construction vehicles, and one of such various types of vehicles, may involve transfer of a high torque to the wheel during construction work. For example, in a wheel loader, an example of a construction vehicle, a heavy load acts on front wheels in a case where grit is scooped up using a bucket provided at a leading end of the vehicle. Thus, traveling in this state causes a high torque to be transferred to the front wheels. In recent years, horsepower of such a wheel loader has been increased, and the torque transferred to the wheels tends to increase, causing the wheels to be often used under stringent conditions. Thus, in wheels mounted in construction vehicles such as wheel loaders, what is called rim slippage, referring to slippage between the rim and the bead portion, may occur due to the increased horsepower of the vehicle and the more stringent use conditions. In other words, the torque transferred to the wheels is transferred from the rim wheel to the pneumatic tire via the bead portion, and in a case where the torque transferred from the rim wheel to the bead portion is excessively high, slippage may occur between the rim and the bead portion. In a case where rim slippage occurs between the rim wheel and the pneumatic tire as described above, rubber in the bead base portion, corresponding to an inner circumferential surface of the bead portion and contacting the rim, is worn away, and the bead base portion may be damaged.

A cause of such rim slippage may be an insufficient fastening force of the bead portion acting on the rim. Techniques for increasing the fastening force of the bead portion may include reducing the inner diameter of the bead core of the bead portion and reducing the circumferential length of the bead heel portion of the bead base portion. However, reduction in inner diameter of the bead core and in circumferential length of the bead heel portion increases the fastening force of the bead portion but is likely to locally increase the peak of strain of the rubber forming the bead base portion. In this case, significant strain of the rubber makes the bead portion susceptible to damage and may degrade bead durability. Additionally, an excessively high pressure between the bead base portion and the rim may degrade mountability on the rim during mounting of the pneumatic tire on the rim wheel.

On the other hand, an example of a technique for reducing the local pressure between the bead base portion and the rim includes widening the bead core as in Japan Patent No. 5629275. However, an excessively large width of the bead core may cause excessively high strain around the bead core. In this case, separation is likely to occur between the members forming the bead portion, and durability may be degraded. As described above, suppressing rim slippage without degrading bead durability has been very difficult.

SUMMARY

The present technology provides a pneumatic tire that can improve bead durability and rim slippage resistance.

A pneumatic tire according to an embodiment of the present technology includes a pair of bead portions disposed on opposite sides of a tire equatorial plane in a tire lateral direction, bead cores each provided on the corresponding bead portion of the pair of bead portions, and a reinforcing layer disposed extending between an inner side and an outer side in a tire lateral direction of the bead cores through an inner side of the bead cores in a tire radial direction, the pneumatic tire being mounted on a specified rim with a 5° taper, the bead core being formed in a hexagonal shape in a tire meridian cross-section and a bead core bottom corresponding to an inner circumferential surface of the bead core being inclined with respect to a tire rotation axis within a range of 0° or larger and 5° or smaller in a direction in which the bead core bottom extends outward in a tire radial direction as the bead core bottom extends from an inner side toward an outer side in the tire lateral direction, in the bead portion, at least a part of the bead base portion corresponding to the inner circumferential surface of the bead portion which part is located inward of the bead core bottom in the tire radial direction being inclined with respect to the tire rotation axis within a range of 8° or larger and 12° or smaller in a direction in which the part extends outward in the tire radial direction as the part extends from the inner side toward the outer side in the tire lateral direction, and assuming that a bead width BW is a distance between a tire inner surface and a tire outer surface on a straight line extending through a bead core center in the tire meridian cross-section and parallel to the bead base portion, the bead core has a maximum width CW within a range of $(BW \times 0.54) \le CW \le (BW \times 0.58)$ in the tire meridian cross-section.

Additionally, preferably, in the pneumatic tire described above, the bead width BW is within a range of $(0.265x+20.5)$ mm $\le BW \le (0.265x+26.5)$ mm with respect to a specified load x kN.

Additionally, preferably, in the pneumatic tire described above, a relationship between the maximum width CW in the tire meridian cross-section and a height CH of the bead core in the tire radial direction is within a range of $1.0 \le (CW/CH) < 1.5$.

Additionally, preferably, in the pneumatic tire described above, the reinforcing layer is formed by coating a cord member with a rubber member, and in the bead portion, a distance in the tire radial direction from a center of the bead core bottom in the tire meridian cross-section to a surface of the cord member in a portion of the reinforcing layer located inward of the bead core in the tire radial direction is within a range of 2.0 mm or longer and 3.5 mm or shorter.

Additionally, preferably, in the pneumatic tire described above, in a case where the pneumatic tire is mounted on the specified rim, a compression ratio of rubber located inward of the bead core in the tire radial direction is within a range of 45% or more and 55% or less at a position inward of the center of the bead core bottom in the tire radial direction in the tire meridian cross-section.

Additionally, preferably, in the pneumatic tire described above, a width of the bead core bottom is within a range of 33% or more and 40% or less of a width of the bead base portion.

Additionally, preferably, in the pneumatic tire described above, a distance between the bead core and a tire outer surface in the tire lateral direction at a position of the bead core maximum width is within a range of (0.004x+13.5) mm or longer and {(0.004x+13.5)×1.2} mm or shorter with respect to a specified load x kN.

The pneumatic tire according to the embodiment of the present technology can achieve an effect that improves bead durability and rim slippage resistance.

BRIEF DESCRIPTION OF DRAWINGS

FIG. 5A is a table showing the results of performance evaluation tests of pneumatic tires.

FIG. 5B is a table showing the results of performance evaluation tests of pneumatic tires.

DETAILED DESCRIPTION

Pneumatic tires according to embodiments of the present technology are described in detail below with reference to the drawings. However, the present technology is not limited by the embodiments. Constituents of the following embodiments include elements that are essentially identical or that can be substituted or easily conceived by one skilled in the art.

Herein, "tire radial direction" refers to the direction orthogonal to a tire rotation axis (not illustrated) corresponding to the rotation axis of a pneumatic tire 1. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the circumferential direction with the tire rotation axis as a center axis. Additionally, "tire lateral direction" refers to a direction parallel to the rotation axis. "Inward in the tire lateral direction" refers to a direction toward a tire equatorial plane (tire equator line) CL in the tire lateral direction. "Outward in the tire lateral direction" refers to a direction away from the tire equatorial plane CL in the tire lateral direction. "Tire equatorial plane CL" refers to a plane orthogonal to the tire rotation axis and extending through the center of the tire width of the pneumatic tire 1. In the tire equatorial plane CL, a center line in the tire lateral direction corresponding to the center position of the pneumatic tire 1 in the tire lateral direction aligns with a position in the tire lateral direction. "Tire width" is the width in the tire lateral direction between outermost components in the tire lateral direction, or in other words, the distance between components that are the most distant from the tire equatorial plane CL in the tire lateral direction. "Tire equator line" refers to the line in the tire circumferential direction of the pneumatic tire 1 that lies on the tire equatorial plane CL. Additionally, in the following description, "tire meridian direction" refers to a cross-section of the tire taken along a plane that includes the tire rotation axis.

Figure 1:
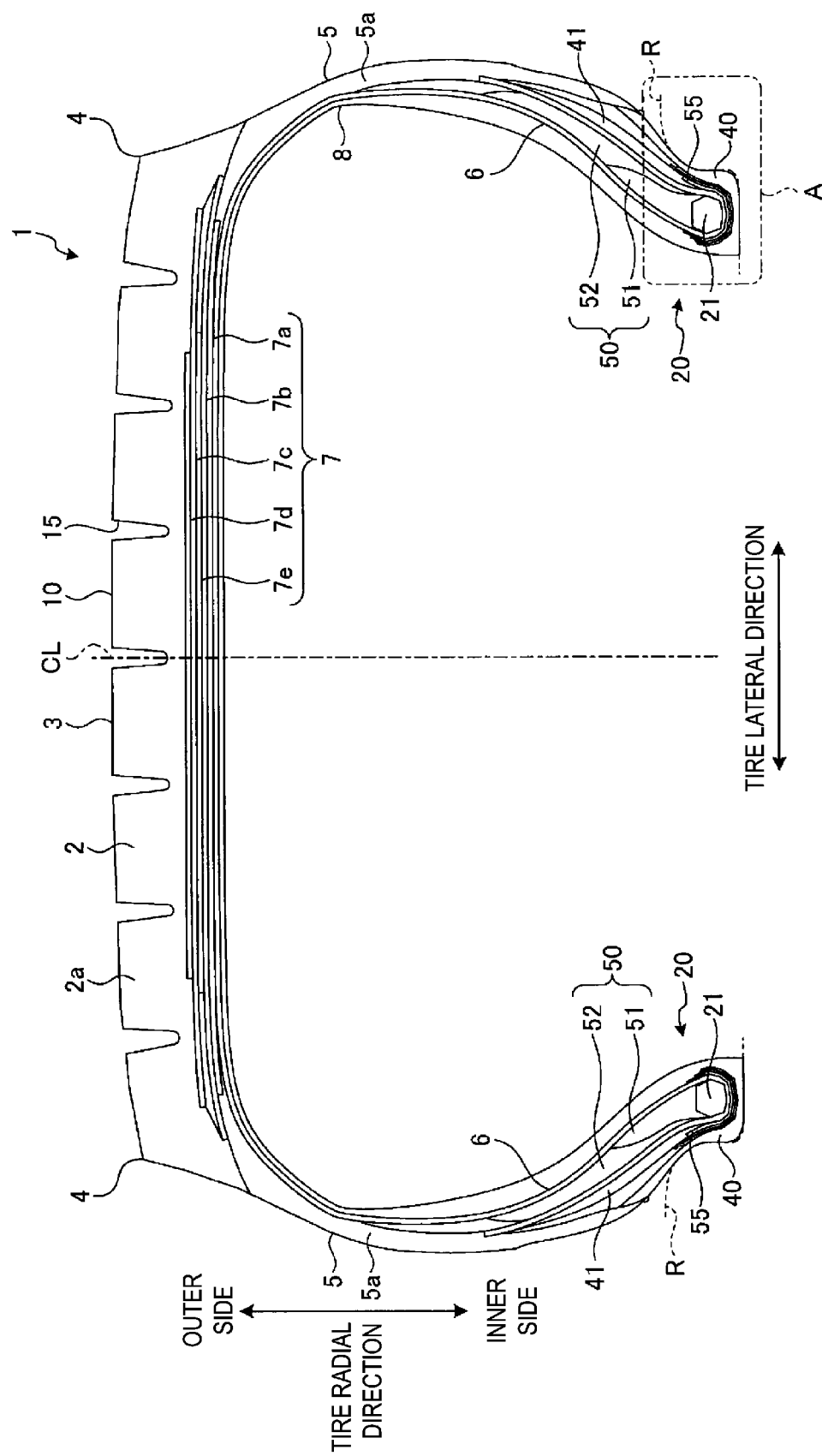
FIG. 1 is a meridian cross-sectional view illustrating a main portion of a pneumatic tire according to an embodiment.

FIG. 1 is a meridian cross-sectional view illustrating a main portion of a pneumatic tire 1 according to an embodiment. The pneumatic tire 1 according to the present embodiment is a radial tire for a construction vehicle, referred to as an off the road tire (OR tire). The pneumatic tire 1 illustrated in FIG. 1 as the present embodiment, in a tire meridian cross-sectional view, is provided with a tread portion 2 in the outermost portion in the tire radial direction. The tread portion 2 is formed of tread rubber 2a including a rubber composition. The surface of the tread portion 2, that is, a portion of the tread portion 2 coming into contact with a road surface in a case where a vehicle (not illustrated) equipped with the pneumatic tire 1 travels, is formed as a ground contact surface 3.

A plurality of grooves such as circumferential grooves 15 extending in the tire circumferential direction and lug grooves extending in the tire lateral direction are formed in the ground contact surface 3 of the tread portion 2. A plurality of land portions 10 are defined and formed by the grooves in the tread portion 2.

Both ends of the tread portion 2 in the tire lateral direction are formed as shoulder portions 4, and sidewall portions 5 are each disposed from the corresponding shoulder portion 4 to a predetermined position inward of the shoulder portion 4 in the tire radial direction. In other words, the sidewall portions 5 are disposed at two positions on the opposite sides of the pneumatic tire 1 in the tire lateral direction. The sidewall portion 5 is formed of side rubber 5a including a rubber composition.

Furthermore, bead portions 20 are each located inward of the corresponding sidewall portion 5 in the tire radial direction. The bead portions 20 are disposed at two positions on the opposite sides of the tire equatorial plane CL similarly to the sidewall portions 5. In other words, the paired bead portions 20 are disposed on the opposite sides of the tire equatorial plane CL in the tire lateral direction. The paired bead portions 20 are each provided with a bead core 21, and bead fillers 50 are each provided outward of the bead core 21 in the tire radial direction. The bead core 21 is formed by winding bead wires, including steel wires, into a ring shape. The bead filler 50 is a rubber material that is disposed in a space formed by a tire lateral direction end portion of a carcass 6 described below being folded back outward in the tire lateral direction at the position of the bead core 21. Additionally, the bead filler 50 includes a lower filler 51 disposed in contact with an outer circumferential surface of the bead core 21, and an upper filler 52 disposed at a position outward of the lower filler 51 in the tire radial direction.

The bead portion 20 is mountable on a rim wheel including a specified rim R with a 5° taper. Specifically, the pneumatic tire 1 according to this embodiment can be mounted on the specified rim R including a portion fitted to the bead portion 20 and inclining outward in the tire radial direction at an inclination angle of 5°±1° with respect to the rotation axis of the rim wheel, as the portion extends from an inner side toward an outer side in the tire lateral direction. Note that "specified rim R" refers to an "applicable rim" defined by JATMA (The Japan Automobile Tyre Manufacturers Association, Inc.), a "Design Rim" defined by TRA (The Tire and Rim Association, Inc.), or a "Measuring Rim" defined by ETRTO (European Tire and Rim Technical Organization).

A belt layer 7 is provided inward of the tread portion 2 in the tire radial direction. The belt layer 7 has a multilayer structure in which three or more belt plies are layered, and in a typical OR tire, four to eight belt plies are layered. In the present embodiment, the belt layer 7 includes five layers of belt plies 7a, 7b, 7c, 7d, and 7e. The belt plies 7a, 7b, 7c, 7d, and 7e thus forming the belt layer 7 are formed by coating a plurality of belt cords made of steel or an organic fiber material with coating rubber and executing a rolling process on resultant belt cords. Additionally, the belt plies 7a, 7b, 7c, 7d, and 7e include belt cords having different inclination angles in the tire lateral direction with respect to the tire circumferential direction, and layered such that the inclining directions of the belt cords cross one another; the belt plies 7a, 7b, 7c, 7d, and 7e are configured as what is called a cross ply structure. Thus, the belt layer 7 has an increased structural strength. The five belt plies 7a, 7b, 7c, 7d, and 7e include, for example, a large-angle belt 7a, a pair of cross belts 7b and 7c, a belt cover 7d, and a circumferential reinforcing layer 7e.

A carcass 6 is provided in a continuous manner inward of the belt layer 7 in the tire radial direction and on the equatorial plane CL side of the sidewall portion 5. The carcass 6 has a single layer structure made of one carcass ply or a multilayer structure made of a plurality of carcass plies, and extends in a toroidal form between the bead cores 21 disposed on the opposite sides in the tire lateral direction, forming the backbone of the tire. Specifically, the carcass 6 is disposed extending from one of the bead portions 20 located on the opposite sides in the tire lateral direction to the other bead portion 20, and is turned back outward in the tire lateral direction along the bead core 21 in the bead portion 20, wrapping around the bead core 21 and the bead filler 50. In other words, the carcass 6 extends from the tire lateral direction inner side of the bead core 21 through the tire radial direction inner side of the bead core 21, and is folded back around the bead core 21 in the bead portion 20 and disposed outward of the bead core 21 in the tire lateral direction. Accordingly, the carcass 6 is disposed to extend between the tire lateral direction inner side and outer side of the bead core 21.

Figure 2:
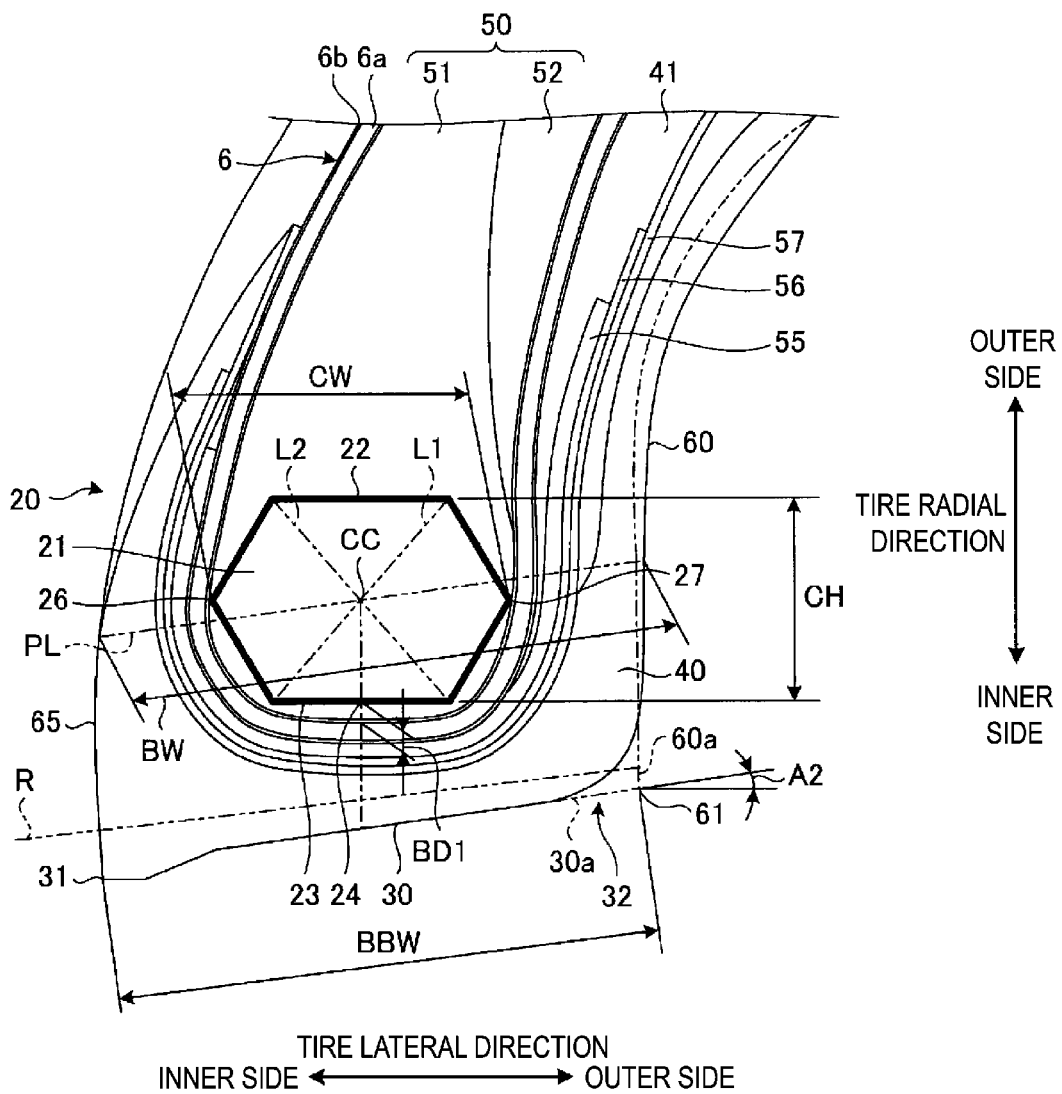
FIG. 2 is a detailed view of portion A of FIG. 1.

The carcass plies of the carcass 6 disposed in this manner are formed by coating, with coating rubber 6b used as a rubber member, a plurality of carcass cords 6a used as cord members made from aramid, nylon, polyester, rayon, or the like, and performing a rolling process on the carcass cords 6a coated with the coating rubber 6b (see FIG. 2). Additionally, the carcass 6 has a carcass angle of 85° or larger and 95° or smaller, the carcass angle corresponding to the inclination angle of the carcass cords 6a with respect to the tire circumferential direction.

Additionally, an inner liner 8 is formed along the carcass 6 on the inward side of the carcass 6 or on the inner side of the carcass 6 in the pneumatic tire 1.

FIG. 2 is a detailed view of portion A of FIG. 1. A chafer including a reinforcing layer that reinforces the carcass 6 is disposed in a portion of the carcass 6 that is folded back around the bead core 21. As a chafer, for example, a steel chafer or a nylon chafer is employed; steel cords are used for the steel chafer as cord members, or cord members made of organic fiber materials are used for the nylon chafer. The nylon chafer is formed from, for example, sheet-shaped members formed by arranging and executing a rolling process on a plurality of organic fiber cords, fabrics formed by weaving a plurality of organic fiber cords, composite materials formed by rubberizing the sheet-shaped members or fabrics, and the like. In the present embodiment, three chafers are used that include a steel chafer 55 including steel cords and sub-chafers 56 and 57 corresponding to nylon chafers, and the three chafers are disposed in layers.

Of the three chafers, the steel chafers 55 are disposed being overlapped with the outer side of the folded back portion of the carcass 6, and are folded back around the bead core 21 from the inner side to the outer side in the tire lateral direction and disposed extending continuously in the tire circumferential direction, like the carcass 6. In other words, the steel chafer 55 is located inward from the carcass 6 in the tire lateral direction in a portion in which the carcass 6 is positioned inward of the bead core 21 in the tire lateral direction, is located inward from the carcass 6 in the tire radial direction in a portion in which the carcass 6 is positioned inward of the bead core 21 in the tire radial direction, and is located outward of the carcass 6 in the tire lateral direction in a portion in which the carcass 6 is positioned outward of the bead core 21 in the tire lateral direction.

Additionally, the sub-chafers 56 and 57 are disposed on top of each other on a side opposite, in the thickness direction of the steel chafer 55, to a side on which the carcass 6 is positioned. In other words, like the steel chafer 55, the sub-chafers 56 and 57 are folded back around the bead core 21 from the inner side to the outer side in the tire lateral direction and disposed extending continuously in the tire circumferential direction. The three chafers are disposed such that, in a case where, in a tire meridian cross-section corresponding to a meridian cross-section of the pneumatic tire 1, an inner side is defined as a side on which the bead core 21 is located in the thickness direction of the chafer, with an outer side defined as a side opposite to the side on which the bead core 21 is located, the steel chafer 55 is disposed at the innermost side, the sub-chafer 56 is disposed outward of the steel chafer, and the sub-chafer 57 is disposed outward of the sub-chafer 56 as described above. The sub-chafers 56 and 57 disposed outward of the steel chafer 55 serve as auxiliary reinforcing layers.

Additionally, shock absorbing rubber 41 is disposed sandwiched between the carcass 6 and the steel chafer 55. Specifically, the shock absorbing rubber 41 is disposed between a portion of the carcass 6 located outward of the bead core 21 in the tire lateral direction and a portion of the steel chafer 55 located outward of the bead core 21 in the tire lateral direction. In addition, the shock absorbing rubber 41 is also disposed, in the tire meridian cross-section, in a region outward from the steel chafer 55 and the sub-chafers 56 and 57 in the tire radial direction. In other words, the shock absorbing rubber 41 is disposed between the carcass 6 and the steel chafer 55 within a range in the tire radial direction in which the steel chafer 55 is disposed, and is disposed in a region outward from the steel chafer 55 and the sub-chafers 56 and 57 in the tire radial direction along a portion of the carcass 6 located outward of the bead core 21 in the tire lateral direction.

Furthermore, rim cushion rubber 40 is disposed outward of the steel chafer 55 and the sub-chafers 56 and 57, and is disposed outward of the sub-chafer 57. Like the steel chafer 55 and the sub-chafers 56 and 57, the rim cushion rubber 40 is disposed extending from the inner side of the bead core 21 in the tire lateral direction through the inner side of the bead core 21 in the tire radial direction to the outer side of the bead core 21 in the tire lateral direction, and is provided to extend continuously in the tire circumferential direction. The rim cushion rubber 40 disposed in this manner forms a contact surface of the bead portion 20 that contacts a flange of the specified rim R.

Additionally, the bead core 21 formed by winding bead wires in a ring shape is formed in a substantially hexagonal shape in the tire meridian cross-sectional view. Specifically, the bead core 21 includes a bead core bottom 23 corresponding to an inner circumferential surface of the bead core 21 and an outer circumferential surface 22 of the bead core 21, the bead core bottom 23 and the outer circumferential surface 22 being formed substantially parallel to each other in a case where the bead core 21 is viewed as a whole. The bead cores 21 are formed at the positions of opposite ends in the tire lateral direction, each in a substantially hexagonal shape including corner portions protruding in the tire lateral direction.

Note that the bead core bottom 23 of the bead core 21 in this case refers to, in the tire meridian cross-section, a surface indicated by an imaginary straight line tangent to parts of a plurality of the bead wires exposed from a surface of the bead core 21, the plurality of bead wires being aligned in a row at a position inward of the bead core 21 in the tire radial direction and forming the surface of the bead core 21. Similarly, the outer circumferential surface 22 of the bead core 21 refers to a surface indicated by an imaginary straight line tangent to parts of a plurality of the bead wires exposed from a surface of the bead core 21, the plurality of bead wires being aligned in a row at a position outward of the bead core 21 in the tire radial direction and forming the surface of the bead core 21 in a case where the pneumatic tire 1 is viewed in a meridian cross-section.

Additionally, in the bead portion 20, a bead base portion 30 corresponds to an inner circumferential surface of the bead portion 20 and serves as a fitting portion when the pneumatic tire 1 according to the present embodiment is mounted on the specified rim R, and the bead base portion 30 is inclined with respect to the tire rotation axis in a direction in which the bead base portion 30 extends outward in the tire radial direction, as the bead base portion 30 extends from the inner side toward the outer side in the tire lateral direction. Additionally, the inclination angle of the bead base portion 30 with respect to the tire rotation axis changes at a position between a bead toe 31 corresponding to an inner end portion in the tire lateral direction and a bead heel 32 corresponding to an outer end portion in the tire lateral direction. Specifically, the inclination angle with respect to the tire rotation axis of the bead base portion 30 is larger in a portion of the bead base portion 30 inward of a predetermined position closer to the bead toe 31 in the tire lateral direction than in a portion of the bead base portion 30 outward of the position in the tire lateral direction.

Additionally, the portion of the bead base portion 30 corresponding to the bead heel 32 is formed like a curved surface. In other words, in the bead base portion 30, a tire outer surface 60 corresponding to an outer surface of the bead portion 20 in the tire lateral direction and the bead base portion 30 are connected by an arc in the tire meridian cross-sectional view.

Additionally, at least a portion of the bead base portion 30 located inward of the bead core bottom 23 in the tire radial direction and corresponding to the inner circumferential surface of the bead portion 20 is inclined with respect to the tire rotation axis within the range of 8° or larger and 12° or smaller in a direction in which the bead base portion 30 extends outward in the tire radial direction, as the bead base portion 30 extends from the inner side toward the outer side in the tire lateral direction. In other words, at least a portion of the bead base portion 30 located inward of the bead core bottom 23 in the tire radial direction is formed such that an angle A2 to a line parallel to the tire rotation axis is within the range of 8° or larger and 12° or smaller.

Note that the angle A2 of the bead base portion 30 is obtained in a case where the position, in the tire lateral direction, of an intersection point 61 between an extension line 60a obtained by extending the tire outer surface 60 inward in the tire radial direction and an extension line 30a obtained by extending the bead base portion 30 outward in the tire lateral direction is located at the position in the tire lateral direction of the intersection point 61 obtained in a case where the pneumatic tire 1 is mounted on the specified rim R.

In other words, deflection of the pneumatic tire 1 varies the angle of the bead base portion 30 according to the condition of the deflection of the pneumatic tire 1, and in a case where the position, in the tire lateral direction, of the intersection point 61 between the extension line 60a of the tire outer surface 60 and the extension line 30a of the bead base portion 30 obtained before the pneumatic tire 1 is mounted on the specified rim R is located at the position in the tire lateral direction of the intersection point 61 obtained after the pneumatic tire 1 is mounted on the specified rim R, the angle A2 on the portion of the bead base portion 30 located inward of the bead core bottom 23 in the tire radial direction is within the range of 8° or larger and 12° or smaller with respect to the tire rotation axis. In other words, in a case where the interval between the intersection points 61 of the bead portions 20 located on the opposite sides in the tire lateral direction before the pneumatic tire 1 is mounted on the specified rim R is set equal to the interval between the intersection points 61 obtained after the pneumatic tire 1 is mounted on the specified rim R, the angle A2 on the portion of the bead base portion 30 located inward of the bead core bottom 23 in the tire radial direction is within the range of 8° or larger and 12° or smaller with respect to the tire rotation axis.

Figure 3:
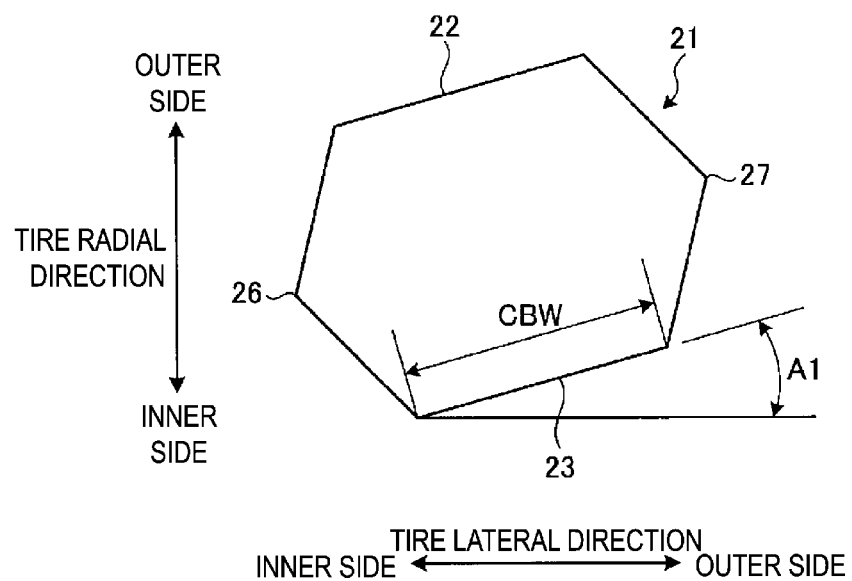
FIG. 3 is an explanatory diagram of an inclination of a bead core bottom.

FIG. 3 is an explanatory diagram of the inclination of the bead core bottom 23. The bead core 21 having a hexagonal cross-sectional shape is inclined within the range of 0° or larger and 5° or smaller with respect to the tire rotation axis in a direction in which the bead core bottom 23 extends outward in the tire radial direction as the bead core bottom 23 extends from the inner side toward the outer side in the tire lateral direction. Specifically, the bead core bottom 23 is formed parallel to the tire rotation axis, or is formed with a slight inclination in the direction in which the bead core bottom 23 extends outward in the tire radial direction as the bead core bottom 23 extends from the inner side toward the outer side in the tire lateral direction, and an angle A1 to a line parallel to the tire rotation axis is within the range of 0° or larger and 5° or smaller. Like the angle A2 of the bead base portion 30, the angle A1 of the bead core bottom 23 is obtained in a case where the interval between the intersection points 61 of the bead portions 20 located on the opposite sides in the tire lateral direction before the pneumatic tire 1 is mounted on the specified rim R is set equal to the interval between the intersection points 61 obtained after the pneumatic tire 1 is mounted on the specified rim R.

A width CBW of the bead core bottom 23 formed in this manner is within the range of 33% or more and 40% or less of a width BBW of the bead base portion 30 (see FIG. 2). The width CBW of the bead core bottom 23 in this case is the distance between the end portions of the bead core bottom 23 in the tire meridian cross-section. Additionally, the width BBW of the bead base portion 30 is the distance between the bead toe 31 and the bead heel 32 in the tire meridian cross-section. Note that, in a case where the bead heel 32 is formed into a curved surface, the width BBW of the bead base portion 30 is the distance between the bead toe 31 and the intersection point 61 between the extension line 60*a* of the tire outer surface 60 and the extension line 30*a* of the bead base portion 30.

Additionally, a maximum width CW of the bead core 21 in the tire meridian cross-section is within the range of (BW×0.54)≤CW≤(BW×0.58) with respect to a bead width BW corresponding to the width of the bead portion 20. The bead width BW in this case is the distance between a tire inner surface 65 and the tire outer surface 60 on a straight line PL extending through a bead core center CC corresponding to the center of the bead core 21 in the tire meridian cross-section and parallel to the bead base portion 30. In the pneumatic tire 1 according to the present embodiment, the bead width BW is within the range of (0.265x+20.5) mm≤BW≤(0.265x+26.5) mm with respect to the specified load x kN.

Note that "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Additionally, a maximum width CW of the bead core 21 is the distance between a bead core inner end portion 26 corresponding to an inner end portion of the bead core 21 in the tire lateral direction and a bead core outer end portion 27 corresponding to an outer end portion of the bead core 21 in the tire lateral direction.

Additionally, the bead core center CC is an intersection portion between an imaginary line L1 connecting a tire lateral direction outer end portion of the outer circumferential surface 22 of the bead core 21 and a tire lateral direction inner end portion of the bead core bottom 23 and an imaginary line L2 connecting a tire lateral direction inner end portion of the outer circumferential surface 22 and a tire lateral direction outer end portion of the bead core bottom 23 in the tire meridian cross-sectional view. Specifically, in the tire meridian cross-sectional view, the imaginary line L1 connects the center of the bead wire included in the bead wires forming the outer circumferential surface 22 of the bead core 21 and located outermost in the tire lateral direction and the center of the bead wire included in the bead wires forming the bead core bottom 23 and located innermost in the tire lateral direction. Similarly, in the meridian cross-section view, the imaginary line L2 connects the center of the bead wire included in the bead wires forming the outer circumferential surface 22 of the bead core 21 and located innermost in the tire lateral direction and the center of the bead wire included in the bead wires forming the bead core bottom 23 and located outermost in the tire lateral direction.

Additionally, the straight line PL parallel to the bead base portion 30 is a straight line parallel to a position in the bead base portion 30 located inward of the bead core center CC in the tire radial direction, that is, a straight line parallel to the same portion of the bead base portion 30 as the position of the bead core center CC in the tire lateral direction.

Additionally, in the bead core 21, a relationship between the maximum width CW and a height CH in the tire radial direction in the tire meridian cross-section is within the range of 1.0≤(CW/CH)<1.5. Note that, for the height CH of the bead core 21, the distance between the outer circumferential surface 22 and the bead core bottom 23 in the tire meridian cross-section may be defined as the height CH of the bead core 21.

Additionally, in the bead portion 20, a distance BD1, in a tire radial direction, from a bead core bottom center 24 corresponding to a center of the bead core bottom 23 in the meridian cross-section to a surface of the carcass cord 6*a* in a portion of the carcass 6 located inward of the bead core 21 in the tire radial direction is within the range of 2.0 mm or larger and 3.5 mm or smaller in a case where the pneumatic tire 1 is not mounted on the specified rim R. Specifically, the distance BD1 is a distance between the bead core bottom center 24 and the position of the bead core bottom center 24 in the tire lateral direction on a bead core 21-side surface of the carcass cord 6*a* in a portion of the carcass 6 located inward of the bead core 21 in the tire radial direction, in the meridian cross-section. In other words, a slight amount of rubber member is present between the bead core 21 and a portion of the carcass 6 located inward of the bead core 21 in the tire radial direction, and in the bead portion 20, a thickness Ga1 of the rubber member from the bead core bottom center 24 in the tire meridian cross-section to the surface of the carcass cord 6*a* in the portion of the carcass 6 located inward of the bead core 21 in the tire radial direction is within the range of 2.0 mm or larger and 3.5 mm or smaller.

Figure 4:
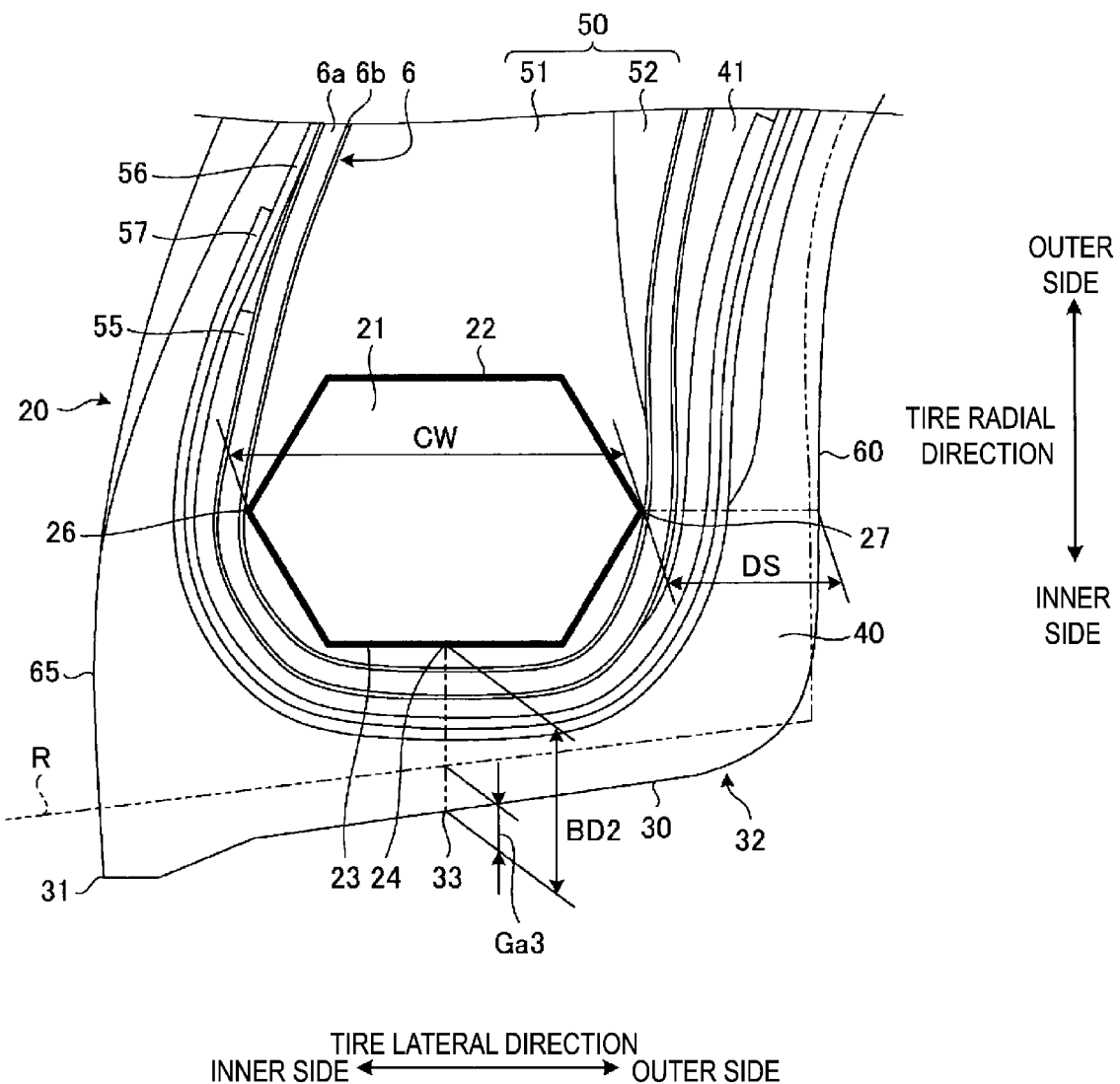
FIG. 4 is an explanatory diagram of a compression ratio of rubber located inward of a bead core in the tire radial direction.

FIG. 4 is an explanatory diagram of the compression ratio of the rubber located inward of the bead core 21 in the tire radial direction. In a case where the pneumatic tire 1 is mounted on the specified rim R, the rubber located inward of the bead core 21 in the tire radial direction is compressed to allow the bead portion 20 to apply, to the specified rim R, pressure acting from the outer side toward the inner side in the tire radial direction, enabling a fitting force to be exerted on the specified rim R. As described above, in a case where the pneumatic tire 1 is mounted on the specified rim R, a compression ratio of the rubber located inward of the bead core 21 in the tire radial direction is within the range of 45% or more and 55% or less at a position inward of the bead core bottom center 24 in the tire radial direction in the tire meridian cross-section.

The compression ratio of the rubber in this case corresponds to the ratio of a thickness Ga3 of the rubber members such as the carcass 6 and the cord members of the chafers that are compressed in the tire radial direction in a case where the pneumatic tire 1 is mounted on the specified rim R to a thickness Ga2 obtained by subtracting the thickness of the members other than the rubber members from a distance BD2 between the bead core bottom center 24 and the bead base portion 30 in the tire radial direction in the tire meridian cross-section before the pneumatic tire 1 is mounted on the specified rim R. In other words, in a case where the pneumatic tire 1 is mounted on the specified rim R, the compression ratio Z of the rubber located inward of the bead core 21 in the tire radial direction has a value calculated by Formula (1) below. In the pneumatic tire 1 according to the present embodiment, the compression ratio Z calculated by Formula (1) is within the range of 45% or more and 55% or less.

$$\text{Compression ratio } Z = (Ga3/Ga2) \times 100 \tag{1}$$

Note that the thickness Ga3 of the rubber members compressed in the tire radial direction in a case where the pneumatic tire 1 is mounted on the specified rim R, the thickness Ga3 being used in Formula (1), specifically indicates the amount of displacement of a reference position 33 between before and after the pneumatic tire 1 is mounted on the specified rim R, the reference position 33 corresponding to a portion of the bead base portion 30 located at the same position as that of the bead core bottom center 24 in the tire lateral direction.

Furthermore, in the bead portion 20, a distance DS between the bead core 21 and the tire outer surface 60 in the tire lateral direction at the position of the maximum width CW of the bead core 21 is within the range of (0.004x+13.5) mm or larger and {(0.004x+13.5)×1.2} mm or smaller with respect to the specified load x kN. The distance DS in this case is the distance between the bead core outer end portion 27 and the tire outer surface 60 in the tire lateral direction at the position of the bead core outer end portion 27 in the tire radial direction. In other words, the distance DS is DS= (0.004x+13.5) and has a tolerance of 0% or more and 20% or less with respect to the specified load x kN.

In a case where the pneumatic tire 1 configured as described is mounted on a vehicle, first, the bead base portion 30 is fitted to the specified rim R of the rim wheel to mount the pneumatic tire 1 on the specified rim R, thus mounting the pneumatic tire 1 on the rim wheel. Once mounted on the rim, the pneumatic tire 1 is inflated, and the pneumatic tire 1 inflated is mounted on the vehicle. The pneumatic tire 1 according to the present embodiment is used, for example, as a pneumatic tire 1 for a construction vehicle mounted on a construction vehicle such as a wheel loader.

In a case where the vehicle equipped with the pneumatic tire 1 travels, the pneumatic tire 1 rotates with a portion of the ground contact surface 3 located below in contact with the road surface. The vehicle is driven by transferring a driving force and a braking force to the road surface or generating a turning force based on a frictional force between the ground contact surface 3 and the road surface. For example, in a case where the driving force is transferred to the road surface, motive power generated by a prime mover such as an engine of a vehicle, is transferred to the rim wheel and then from the rim wheel to the pneumatic tire 1.

In this case, the rim wheel and the pneumatic tire 1 are mounted on each other by the fastening force used as the fitting force exerted on the specified rim R of the rim wheel by the bead portion 20 of the pneumatic tire 1, that is, the rim wheel and the pneumatic tire 1 are mounted between the bead portion 20 and the rim wheel by a frictional force between the bead portion 20 and the rim wheel. The fastening force of the bead portion 20 is ensured by the bead core 21 formed by the bead wire being wound in a ring shape.

In other words, in a case where the pneumatic tire 1 is mounted on the rim wheel, the rubber members such as the rim cushion rubber 40 located inward from the bead core 21 in the bead portion 20 in the tire radial direction are sandwiched and compressed between the bead core 21 and the specified rim R. Thus, pressure from the pneumatic tire 1 acting inward in the tire radial direction is exerted on the specified rim R. This pressure serves as a fastening force exerted on the specified rim R by the bead portion 20, and the fastening force causes a significant frictional force to be exerted between the pneumatic tire 1 and the specified rim R to fit the pneumatic tire 1 to the specified rim, thus mounting the pneumatic tire 1 on the rim wheel.

The pneumatic tire 1 is mounted on the rim wheel by the frictional force associated with the fastening force of the bead portion 20 as described above, and thus in a case where a high rotational torque compared to the frictional force is exerted between the pneumatic tire 1 and the rim wheel, slippage may occur between the pneumatic tire 1 and the rim wheel. For example, in a case where the bead portion 20 exerts a weak fastening force and a high rotational torque is transferred from the rim wheel to the pneumatic tire 1, the rotational torque overcomes a restricting force caused by the frictional force between the bead portion 20 and the rim wheel, and slippage may occur between the bead portion 20 and the rim wheel. The pneumatic tire 1 according to the present embodiment is configured to suppress such slippage between the bead portion 20 and the rim wheel.

Specifically, a portion of the specified rim R of the rim wheel fitted to the bead base portion 30 of the pneumatic tire 1 is inclined at an angle of 5°±1° with respect to the rotation axis of the rim wheel, while the bead core bottom 23 in the bead core 21 is formed with the inclination angle A1 within the range of 0° or larger and 5° or smaller with respect to the tire rotation axis. Thus, the bead core 21 can appropriately compress the rubber members such as the rim cushion rubber 40 located between the specified rim R with a 5° taper and the bead core 21 over a predetermined range in the tire lateral direction, and allows the appropriate fastening force to be exerted on the specified rim R.

Additionally, in the bead portion 20, at least a portion of the bead base portion 30 coming into actual contact with the specified rim R which portion is located inward of the bead core bottom 23 in the tire radial direction is inclined within the range of 8° or larger and 12° or smaller with respect to the tire rotation axis. Thus, the appropriate fastening force can be ensured without degrading mountability on rims. In other words, if the inclination angle A2 of the bead base portion 30 with respect to the tire rotation axis is smaller than 8°, the bead toe 31-side diameter of the bead base portion 30 in the tire radial direction increases, making the fastening force on the bead toe 31 side likely to weaken. Additionally, in a case where the inclination angle A2 of the bead base portion 30 with respect to the tire rotation axis is larger than 12°, the bead toe 31-side diameter of the bead base portion 30 in the tire radial direction decreases. Thus, in a case where the pneumatic tire 1 is mounted on the rim wheel, the mounting is difficult. In contrast, in a case where the inclination angle A2 of the bead base portion 30 with respect to the tire rotation axis is set to 8° or larger and 12° or smaller, the fastening force of the bead portion 20 exerted on the specified rim R can be ensured, with mountability on rims achieved.

Additionally, in the bead portion 20, the maximum width CW of the bead core 21 in the tire meridian cross-section is within the range of (BW×0.54)≤CW≤(BW×0.58) with respect to the bead width BW, thus allowing suppression of damage to the rubber members such as the rim cushion rubber 40 and separation of the members surrounding the bead cores 21 and also allowing more reliable suppression of slippage between the bead portion 20 and the rim wheel. In other words, in a case where the maximum width CW of the bead core 21 with respect to the bead width BW is represented by CW≤(BW×0.54), the maximum width CW of the bead core 21 is excessively small. Thus, in a case where the pneumatic tire 1 is mounted on the rim wheel, a locally high fastening force may be exerted by the bead base portion 30, i.e., a locally high contact pressure may be exerted on the specified rim R by the bead base portion 30. This causes a locally high strain on the rubber members such as the rim cushion rubber 40 located inward of the bead core 21 in the tire radial direction. This may in turn make the rubber members likely to be damaged, and hinder effective suppression of slippage between the bead portion 20 and the rim wheel. Additionally, in a case where the maximum width CW of the bead core 21 with respect to the bead width BW is represented by CW>(BW×0.58), the maximum width CW of the bead core 21 is excessively large. Thus, in a case where a heavy load is imposed on the bead portion 20, an excessively high strain may be generated around the bead core 21. In this case, the significant strain may cause separation between the bead core 21 and the surrounding rubber members, or cause separation between the members such as the carcass 6 and the steel chafer 55 located around the bead core 21 and the surrounding rubber members.

In contrast, in a case where the maximum width CW of the bead core 21 is within the range of (BW×0.54)≤CW≤(BW×0.58) with respect to the bead width BW, a local increase in fastening force of bead base portion 30 can be suppressed. In addition, the fastening force of the bead base portion 30 can be exerted on the specified rim R over a wide range enough to suppress an excessively high strain generated around the bead core 21. Accordingly, damage to the rubber members such as the rim cushion rubber 40 can be suppressed, and separation of the members surrounding the bead core 21 can be suppressed. Besides, slippage between the bead portion 20 and the rim wheel can be more reliably suppressed. As a result, the bead durability and the rim slippage resistance can be improved.

Additionally, the bead width BW of the bead portion 20 is within the range of (0.265x+20.5) mm≤BW≤(0.265x+26.5) mm with respect to the specified load x kN. Thus, degradation of mountability on rims and separation of the members surrounding the bead core 21 can be suppressed. In other words, in a case where the bead width BW with respect to the specified load x kN is represented by BW≤(0.265x+20.5) mm, the bead width BW may be excessively small with respect to the specified load x kN. This may cause the members forming the bead portion 20 to be subjected to excessively high stress in a case a heavy load is imposed. In this case, an excessively high strain may be generated around the bead core 21 and separation of the members surrounding the bead core 21 may be likely to occur in a case where a heavy load is imposed. Additionally, in a case where the bead width BW with respect to the specified load x kN is represented by BW>(0.265x+26.5) mm, the bead width BW may be excessively large, and the range in which the bead base portion 30 exerts a fastening force on the specified rim R may be excessively high. This leads to an increase in magnitude of the total fastening force, and thus in a case where the pneumatic tire 1 is mounted on the rim wheel, the mounting may be difficult.

In contrast, in a case where the bead width BW is within the range of (0.265x+20.5) mm≤BW≤(0.265x+26.5) mm with respect to the specified load x kN, the bead width BW can be set appropriate to prevent an excessively wide range within which the fastening force is exerted and to prevent an excessively high strain generated around the bead core 21. Accordingly, both degradation of mountability on rims and separation of the members surrounding the bead core 21 can be suppressed. As a result, with the mountability on rims ensured, the bead durability can be more reliably improved.

Additionally, the relationship between the maximum width CW and the height CH of the bead core 21 in the tire radial direction in the tire meridian cross-section is within the range of 1.0≤(CW/CH)<1.5, thus allowing suppression of damage to the rubber members such as the rim cushion rubber 40 and separation of the members surrounding the bead core 21 and also allowing suppression of slippage between the bead portion 20 and the rim wheel. In other words, in a case where the relationship between the maximum width CW and the height CH of the bead core 21 is (CW/CH)<1.0, the maximum width CW of the bead core 21 is excessively small, and thus a locally high contact pressure may be exerted on the specified rim R by the bead base portion 30 in a case where the pneumatic tire 1 is mounted on the rim. This causes a locally high strain on the rubber members such as the rim cushion rubber 40 located inward of the bead core 21 in the tire radial direction. This in turn makes the rubber members likely to be damaged, and leads to an excessively narrow range within which the fastening force is exerted on the specified rim R. Thus, effective suppression of rim slippage may be difficult. Additionally, in a case where the relationship between the maximum width CW and the height CH of the bead core 21 is (CW/CH)≥1.5, the maximum width CW of the bead core 21 is excessively large, and thus excessively high strain may be generated around the bead core 21 in a case where a heavy load is imposed. In this case, the significant strain may be likely to cause separation of the members surrounding the bead core 21.

In contrast, when the relationship between the maximum width CW and the height CH of the bead core 21 is within the range of (0.265x+20.5) mm≤BW≤(0.265x+26.5) mm, a local increase in fastening force of bead base portion 30 can be suppressed. In addition, the fastening force of the bead base portion 30 can be exerted over a wide range enough to suppress an excessively high strain generated around the bead core 21. This allows suppression of damage to the rubber members such as the rim cushion rubber 40 and separation of the members surrounding the bead core 21, and also allows more reliable suppression of slippage between the bead portion 20 and the rim wheel. As a result, the bead durability and the rim slippage resistance can be more reliably improved.

In addition, in the bead portion 20, the distance BD1 in the tire radial direction from the bead core bottom center 24 in the tire meridian cross-section to the surface of the carcass cords 6a in the portion of the carcass 6 located inward of the bead core 21 in the tire radial direction is within the range of 2.0 mm or longer and 3.5 mm or shorter, and thus the appropriate fastening force of the bead base portion 30 can be more reliably ensured, with damage to the reinforcing layer suppressed. In other words, in a case where the distance BD1 from the bead core bottom center 24 to the surface of the carcass cords 6a in the tire radial direction is shorter than 2.0 mm, the thickness Ga1 of the rubber members located between the bead core 21 and the portion of the carcass cord 6a located inward of the bead core 21 in the tire radial direction is excessively small. This reduces the thickness of the members compressed in a case where the pneumatic tire 1 is mounted on the rim wheel, and ensuring the appropriate fastening force of the bead base portion 30 may be difficult. In this case, effective suppression of slippage between the bead portion 20 and the rim wheel may be difficult. Additionally, in a case where the distance BD1 from the bead core bottom center 24 to the surface of the carcass cord 6a in the tire radial direction is longer than 3.5 mm, the thickness Ga1 of the rubber members located between the bead core 21 and the portion of the carcass cord 6a located inward of the bead core 21 in the tire radial direction and the carcass cords 6a is excessively large. Thus, the thickness of a portion of the rim cushion rubber 40 located inward of the bead core 21 in the tire radial direction may be excessively small. In other words, the thickness of the rim cushion rubber 40 located inward of the sub-chafer 57 in the tire radial direction may be excessively small. In this case, in a case where rim slippage occurs and the rim cushion rubber 40 is worn away, the reinforcing layers such as the sub-chafer 57 are likely to be exposed, making the reinforcing layers likely to be damaged.

In contrast, in a case where the distance BD1 from the bead core bottom center 24 to the surface of the carcass cords 6a in the tire radial direction is within the range of 2.0 mm or longer and 3.5 mm or shorter, the thicknesses of the rubber members on both sides in portions of the reinforcing layers such as the carcass 6 located inward of the bead core 21 in the tire radial direction of the bead core 21 can each be set to an appropriate value. Accordingly, with the likelihood of damage to the reinforcing layers suppressed, the appropriate fastening force of the bead base portion 30 can be more reliably ensured. As a result, the bead durability and the rim slippage resistance can be more reliably improved.

Additionally, in the bead portion 20, in a case where the pneumatic tire 1 is mounted on the specified rim R, the compression ratio Z of the rubber located inward of the bead core 21 in the tire radial direction is within the range of 45% or more and 55% or less at a position inward of the bead core bottom center 24 in the tire radial direction in the tire meridian cross-section. Thus, with damage to the rim cushion rubber 40 suppressed, the appropriate fastening force of the bead base portion 30 can be more reliably ensured. In other words, a compression ratio Z of less than 45% is excessively low, and thus ensuring the appropriate fastening force of the bead base portion 30 may be difficult. In this case, effective suppression of slippage between the bead portion 20 and the rim wheel may be difficult. Additionally, a compression ratio Z of more than 55% is excessively high, and thus the rim cushion rubber 40, forming the bead base portion 30, may be excessively deformed, making the rim cushion rubber 40 likely to be damaged.

In contrast, in a case where the compression ratio Z is within the range of 45% or more and 55% or less, the appropriate fastening force of the bead base portion 30 can be more reliably ensured, with damage to the rim cushion rubber 40 suppressed, which is caused by an excessively high compression ratio Z. As a result, the bead durability and the rim slippage resistance can be more reliably improved.

Additionally, in the bead portion 20, the width CBW of the bead core bottom 23 is within the range of 33% or more and 40% or less of the width BBW of the bead base portion 30, thus allowing suppression of damage to the rubber members and separation of the members surrounding the bead core 21 and allowing more reliable suppression of slippage between the bead portion 20 and the rim wheel. In other words, in a case where the width CBW of bead core bottom 23 is less than 33% of the width BBW of bead base portion 30, the width CBW of bead core bottom 23 is excessively small with respect to the width BBW of bead base portion 30. This may lead to an excessively narrow range within which the compression ratio of the rubber members such as the rim cushion rubber 40 is increased by the bead core 21 and a locally high fastening force exerted by the bead base portion 30 in a case where the pneumatic tire 1 is mounted on the rim. This may be likely to cause an excessively high strain on the rubber members such as the rim cushion rubber 40 located inward of the bead core 21 in the tire radial direction of the bead core 21. This in turn makes the rubber members likely to be damaged, and leads to an excessively narrow range within which the fastening force is exerted on the specified rim R. Thus, effective suppression of rim slippage may be difficult. Additionally, in a case where the width CBW of bead core bottom 23 is more than 40% of the width BBW of bead base portion 30, the width of bead core 21 in the tire lateral direction is excessively large with respect to the width BBW of the bead base portion 30. Thus, in a case where a heavy load is imposed, an excessively high strain may be generated around the bead core 21, and separation of the members surrounding the bead cores 21 may be likely to occur.

In contrast, in a case where the width CBW of bead core bottom 23 is within the range of 33% to 40% of the width BBW of bead base portion 30, a locally high fastening force of bead base portion 30 can be suppressed. In addition, the fastening force of the bead base portion 30 can be exerted on the specified rim R over a wide range enough to suppress an excessively high strain generated around the bead core 21. This allows suppression of damage to the rubber members such as the rim cushion rubber 0 and separation of the members surrounding the bead core 21, and also allows more reliable suppression of slippage between the bead portion 20 and the rim wheel. Additionally, suppressing a locally high fastening force enables a total increase in fastening force, enabling a reduction in difference in fastening force per position in the tire circumferential direction. Thus, rim slippage can be more reliably suppressed. As a result, the bead durability and the rim slippage resistance can be more reliably improved.

Additionally, in the bead portion 20, the distance DS in the tire lateral direction between the bead core 21 and the tire outer surface 60 at the position of the maximum width CW of the bead core 21 is within the range of $(0.004x+13.5)$ mm or longer and $\{(0.004x+13.5)\times 1.2\}$ mm with respect to the specified load x kN. Thus, the fastening force of the whole bead base portion 30 can be more appropriately exerted on the specified rim R. In other words, in a case where the distance DS between the bead core 21 and the tire outer surface 60 is shorter than $(0.004x+13.5)$ mm with respect to the specified load x kN, the position of the bead core 21 in the tire lateral direction may be excessively biased outward in the tire lateral direction, and the distribution of the contact pressure exerted on the specified rim R by the bead base portion 30 may be excessively biased toward the bead heel 32. In this case, the contact pressure on the specified rim R may be excessively low at a position closer to the bead toe 31, and the fastening force of the whole bead base portion 30 is hindered from being appropriately exerted on the specified rim R. Additionally, in a case where the distance DS between the bead core 21 and the tire outer surface 60 is longer than $\{(0.004x+13.5)\times 1.2\}$ mm with respect to the specified load x kN, the position of the bead core 21 may be biased inward in the tire lateral direction, and the distribution of the contact pressure exerted on the specified rim R by the bead base portion 30 may be excessively biased toward the bead toe 31. In this case, the contact pressure on the specified rim R may be excessively low at a position closer to the bead heel 32, and the fastening force of the whole bead base portion 30 is hindered from being appropriately exerted on the specified rim R.

In contrast, in a case where the distance DS between the bead core 21 and the tire outer surface 60 is within the range of $(0.004x+13.5)$ mm or longer and $\{(0.004x+13.5)\times 1.2\}$ or shorter with respect to the specified load x kN, the bead core 21 can be located at the appropriate position in the tire lateral direction, and the fastening force of the whole bead base portion 30 can be more appropriately exerted on the specified rim R. As a result, the bead durability and the rim slippage resistance can be more reliably improved.

Note that, in the pneumatic tire 1 according to the embodiment described above, the one carcass 6 and the three chafers including the steel chafer 55 and the sub-chafers 56 and 57 are disposed in the bead portion 20 as reinforcing layers but that the reinforcing layers may have a different configuration. For example, two or more carcasses 6 may be disposed, or two or less chafers may be provided or the chafers may be omitted.

Examples

FIGS. 5A and 5B are tables showing the results of performance evaluation tests of pneumatic tires. In relation to the pneumatic tire 1 described above, description will be given of performance evaluation tests conducted on a pneumatic tire according to a conventional example, the pneumatic tires 1 according to embodiments of the present technology, and a pneumatic tire according to a comparative example to be compared with the pneumatic tires 1 according to embodiments of the present technology. The performance evaluation tests were conducted on rim slippage resistance indicating performance against rim slippage and bead durability indicating the durability of the bead portion 20.

In the performance evaluation test, the pneumatic tire 1 having a tire nominal size of 29.5R25 and a TRA cord of L-3 is used as a test tire, and the test tire is mounted on a rim wheel conforming to the TRA standard. Air pressure is adjusted to a value specified in the TRA standard, and the pneumatic tire is mounted on a wheel loader used as a test vehicle. Test runs of the wheel loader are conducted, with a load specified by the TRA standard imposed on the wheel loader.

An evaluation method for each test item includes attaching visible marks to the test tire and the rim wheel before the test vehicle is driven and measuring the amount of displacement between the test tire and the rim wheel in the tire circumferential direction after 24 hours of running. The rim slippage resistance is expressed as an index value with the conventional example being assigned the value of 100. Larger values indicate less displacement between the test tire and the rim wheel in the tire circumferential direction, in turn indicating higher rim slippage resistance.

Additionally, the bead durability is evaluated by removing the test tire from the rim wheel after the test vehicle has been driven for 2000 hours, and checking for damage to the bead base portion 30 and separation of the bead portions 20. The bead durability is expressed as an index value with Conventional Example described below assigned the value of 100. Larger values indicate lower likelihood of damage to the bead base portion 30 and separation of the bead portion 20 and thus indicate excellent bead durability.

The performance evaluation tests were conducted on 15 types of pneumatic tires including a pneumatic tire according to a conventional example used as an example of a conventional pneumatic tire, Examples 1 to 13 used as the pneumatic tires 1 according to embodiments of the present technology, and Comparative Example used as a pneumatic tire to be compared with the pneumatic tires 1 according to embodiments of the present technology. In the pneumatic tire according to Conventional Example, the maximum width CW of the bead core 21 is not within the range of (BW×0.54)≤CW≤(BW×0.58) with respect to the bead width BW, and the bead width BW is not within the range of (0.265x+20.5) mm≤BW≤(0.265x+26.5) mm with respect to the specified load x kN. Note that the specified load x for the test tires used in the performance evaluation tests is 176.52 kN, and the bead width BW calculated from the specified load x is within the range of 67.2 mm or larger and 71.2 mm or smaller. Additionally, in the pneumatic tire according to Comparative Example, the bead width BW is within the range of (0.265x+20.5) (mm)≤BW≤(0.265x+26.5) with respect to the specified load x kN. However, the maximum width CW of the bead core 21 is not within the range of (BW×0.54)≤CW≤(BW×0.58) with respect to bead width BW.

In contrast, in all of Examples 1 to 13, used as examples of the pneumatic tire 1 according to the present technology, the maximum width CW of the bead cores 21 is within the range of (BW×0.54)≤CW≤(BW×0.58) with respect to the bead width BW. Furthermore, the pneumatic tires 1 according to Examples 1 to 13 vary in the bead width BW, the maximum width CW of the bead core 21/the height CH of the bead core 21, the distance BD1 from the bead core bottom center 24 to the surface of the carcass cords 6a, the compression ratio Z of the rubber located inward of the bead core 21 in the tire radial direction, the width BBW of the bead core bottom 23/the width BBW of the bead base portion 30, and the distance DS between the bead core 21 and the tire outer surface 60. Note that the distance DS between the bead core 21 and the tire outer surface 60 calculated from the specified load x on the test tires used in the performance evaluation tests is within the range of 14 mm or longer and 16.9 mm or shorter.

The results of the performance evaluation tests using the pneumatic tires 1 indicate that, as shown in FIGS. 5A and 5B, the pneumatic tires 1 according to Examples 1 to 13 can improve both rim slippage resistance and bead durability compared to Conventional Example. In other words, the pneumatic tires 1 according to Examples 1 to 13 can improve the bead durability and the rim slippage resistance.

The invention claimed is:

1. A pneumatic tire, comprising:
a pair of bead portions disposed on opposite sides of a tire equatorial plane in a tire lateral direction;
bead cores each provided on a corresponding bead portion of the pair of bead portions; and
a reinforcing layer disposed extending between an inner side and an outer side in a tire lateral direction of the bead cores through an inner side of the bead cores in a tire radial direction,
the pneumatic tire being mounted on a specified rim with a 5° taper,
the bead core being formed in a hexagonal shape in a tire meridian cross-section and a bead core bottom corresponding to an inner circumferential surface of the bead core being inclined with respect to a tire rotation axis within a range of 0° or larger and 5° or smaller in a direction in which the bead core bottom extends outward in a tire radial direction as the bead core bottom extends from an inner side toward an outer side in the tire lateral direction,
in the bead portion, at least a part of a bead base portion corresponding to the inner circumferential surface of the bead portion which part is located inward of the bead core bottom in the tire radial direction being inclined with respect to the tire rotation axis within a range of 8° or larger and 12° or smaller in a direction in which the part extends outward in the tire radial direction as the part extends from the inner side toward the outer side in the tire lateral direction, and
assuming that a bead width BW is a distance between a tire inner surface and a tire outer surface on a straight line extending through a bead core center in the tire meridian cross-section and parallel to the bead base portion, the bead core has a maximum width CW within a range of (BW×0.55)≤CW≤(BW×0.57) in the tire meridian cross-section, wherein the bead width BW is within a range of (0.265x+20.5) mm≤BW≤(0.265x+26.5) mm with respect to a specified load x kN.

2. The pneumatic tire according to claim 1, wherein
a relationship between the maximum width CW in the tire meridian cross-section and a height CH in the tire radial direction is within a range of 1.0≤(CW/CH)<1.5.

3. The pneumatic tire according to claim 1, wherein
the reinforcing layer is formed by coating a cord member with a rubber member, and
in the bead portion, a distance in the tire radial direction from a center of the bead core bottom in the tire meridian cross-section to a surface of the cord member in a portion of the reinforcing layer located inward of the bead core in the tire radial direction is within a range of 2.0 mm or longer and 3.5 mm or shorter.

4. The pneumatic tire according to claim 1, wherein
in a case where the pneumatic tire is mounted on the specified rim, a compression ratio of rubber located inward of the bead core in the tire radial direction is within a range of 45% or more and 55% or less at a position inward of the center of the bead core bottom in the tire radial direction in the tire meridian cross-section.

5. The pneumatic tire according to claim 1, wherein
a width of the bead core bottom is within a range of 33% or more and 40% or less of a width of the bead base portion.

6. The pneumatic tire according to claim 1, wherein
a distance between the bead core and a tire outer surface in the tire lateral direction at a position of a bead core maximum width is within a range of (0.004x+13.5) mm or longer and {(0.004x+13.5)×1.2} mm or shorter with respect to a specified load x kN.

7. The pneumatic tire according to claim 2, wherein
the reinforcing layer is formed by coating a cord member with a rubber member, and
in the bead portion, a distance in the tire radial direction from a center of the bead core bottom in the tire meridian cross-section to a surface of the cord member in a portion of the reinforcing layer located inward of the bead core in the tire radial direction is within a range of 2.0 mm or longer and 3.5 mm or shorter.

8. The pneumatic tire according to claim 7, wherein
in a case where the pneumatic tire is mounted on the specified rim, a compression ratio of rubber located inward of the bead core in the tire radial direction is within a range of 45% or more and 55% or less at a position inward of the center of the bead core bottom in the tire radial direction in the tire meridian cross-section.

9. The pneumatic tire according to claim 8, wherein
a width of the bead core bottom is within a range of 33% or more and 40% or less of a width of the bead base portion.

10. The pneumatic tire according to claim 9, wherein
a distance between the bead core and a tire outer surface in the tire lateral direction at a position of a bead core maximum width is within a range of (0.004x+13.5) mm or longer and {(0.004x+13.5)×1.2} mm or shorter with respect to a specified load x kN.

* * * * *